Oct. 30, 1928.
H. G. McCOMB
1,689,883
VEHICLE SUSPENSION
Filed March 11, 1926
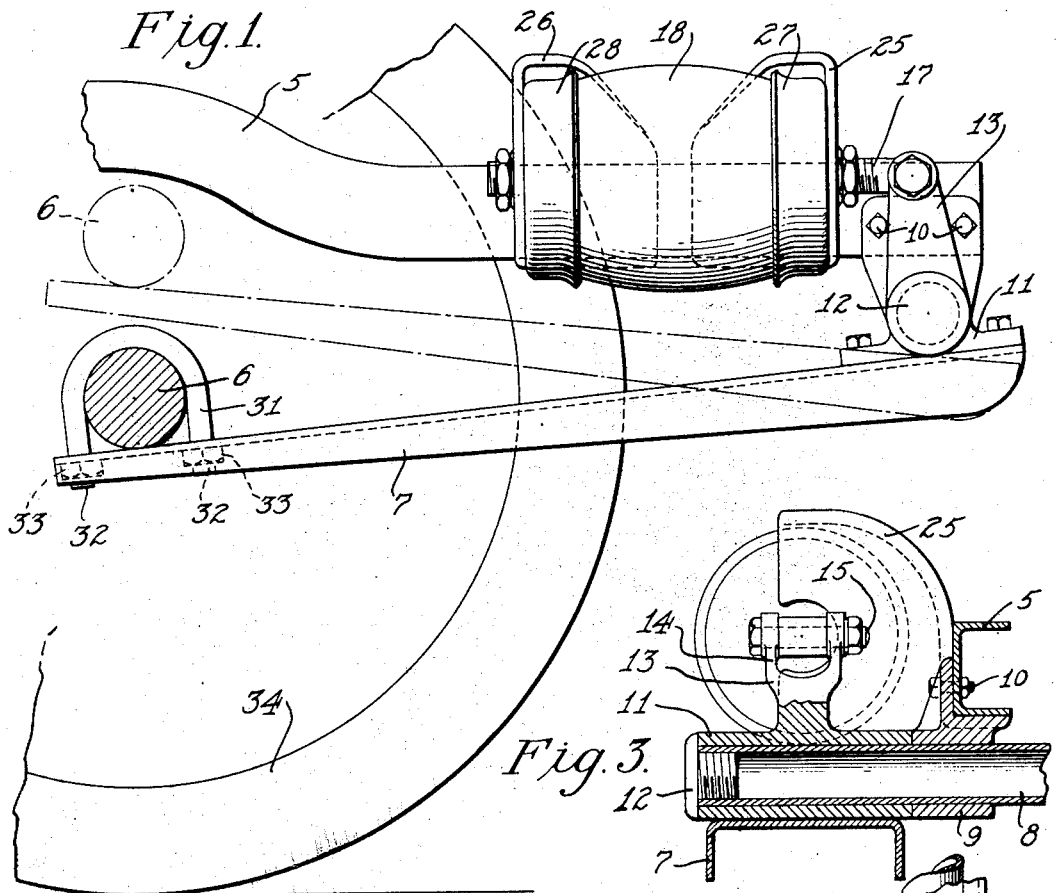
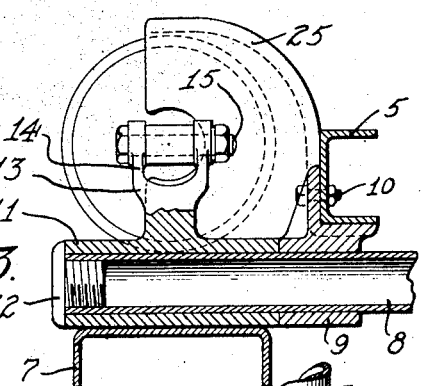
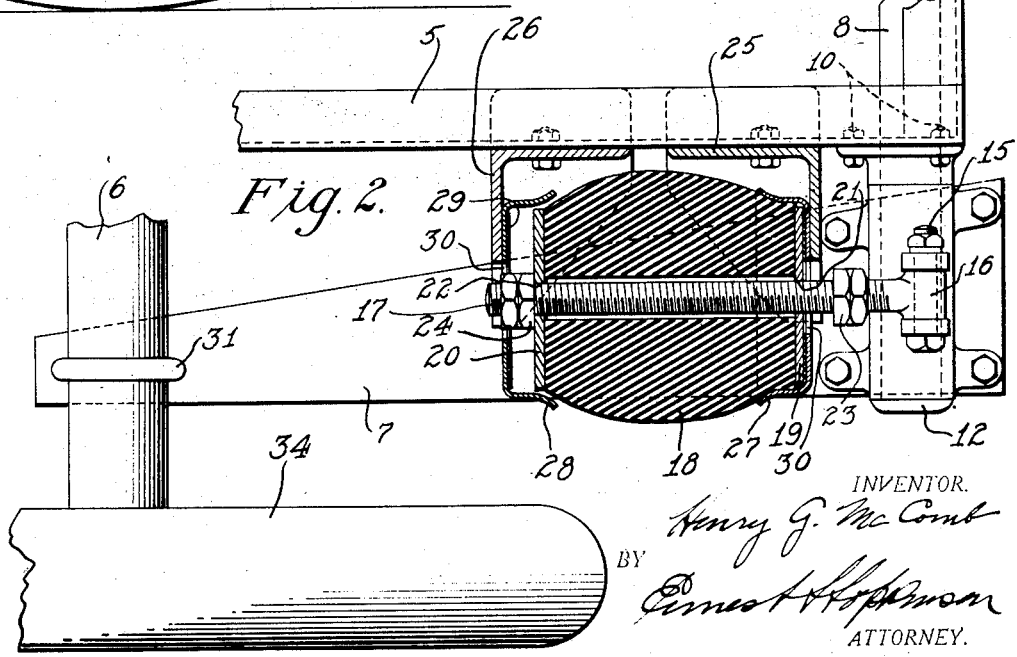
INVENTOR.
Henry G. McComb
BY
Ernest H. Hopkinson
ATTORNEY.

Patented Oct. 30, 1928.

1,689,883

UNITED STATES PATENT OFFICE.

HENRY G. McCOMB, OF NEW YORK, N. Y., ASSIGNOR TO THE MECHANICAL RUBBER COMPANY, OF CLEVELAND, OHIO, A CORPORATION OF NEW JERSEY.

VEHICLE SUSPENSION.

Application filed March 11, 1926. Serial No. 93,875.

This invention relates to vehicles, but more particularly to body suspensions for the same and has for its primary object to produce a simple, economical and durable form of suspension which will provide greater comfort in riding and increase the life of the vehicle.

Further objects of the invention are to eliminate metal springs and the rebounding and vibrating actions inherent therein, to eliminate "tramping" of the front axle, to provide smoother steering action, to eliminate noise, to provide additional safety, and to reduce the cost of maintenance.

Practically all vehicles at the present time are provided with leaf spring suspensions but this form has not proven entirely satisfactory partially on account of the tendency of the springs to rebound after a shock, and it has been customary to provide various attachments to eliminate as far as possible this action. Another disadvantageous feature is the vibration or oscillation which occurs in steel springs after the spring has been subjected to shock. This vibration or oscillation is very rapid and continues for a considerable period. The leaf spring produces less vibration than other forms of spring on account of the internal friction which tends to provide a slight damping effect but even with the most efficient steel spring constructions the rebounding action and the periodic vibration are present to a considerable degree. The well known "tramping" of the front axle due to oscillations of the springs is exceedingly unpleasant and renders steering difficult at times.

In order to eliminate the disadvantages of the steel spring, a form of vehicle suspension has been devised which consists primarily of a block or mass of rubber interposed between certain mechanical suspension elements in such a way as to yieldingly resist both the initial shock and the rebound following thereafter. The physical properties of rubber are well known and need not be discussed here, but it is well to mention in this connection the high internal friction which gives to it the ability to absorb vibration.

The many other objects and advantages of the present invention will be better understood by reference to the following specification when considered in connection with the accompanying drawings illustrating a selected embodiment thereof, in which:

Fig. 1 is a side elevation of a rear suspension unit.

Fig. 2 is a top plan view partially in section of the unit shown in Fig. 1, and

Fig. 3 is an end elevation partially in section of the unit shown in Fig. 1.

Referring to the drawings, the vehicle suspension unit selected to illustrate the principles of the present invention connects one side of the main frame 5 with the rear axle 6. A lever 7 is fulcrumed on a shaft 8 supported by brackets 9 attached by bolts 10 or other suitable means to the frame 5. In the present embodiment the shaft 8 extends across the vehicle frame and the brackets 9 are mounted on the respective side members thereof. While a continuous shaft of this kind is advantageous in that it provides additional strength, it will be readily evident that separate shafts or pivots may be provided on each of the side frames for the individual suspension units. This lever 7 is bolted or otherwise attached to a bearing sleeve or bracket 11 which is revoluble on the shaft 8 and retained thereon by means of a threaded plug 12 fitting within the end of the shaft. A post or arm 13 projects upwardly from this sleeve or bracket 11 and its bifurcated upper extremity 14 is pivotally connected to one end 16 of an eye bolt 17 by means of the bolt 15. This bolt 17 extends through a block 18 of rubber which in the present embodiment is substantially cylindrical in form. Discs or plates 19 and 20 are provided at opposite ends of the rubber block 18 and the bolt 17 freely passes through centrally located perforations 21 and 22 respectively therein. Adjustable nuts 23 and 24 are provided on the bolt 17 to co-act with the plates 19 and 20 to compress the rubber block 18 in the manner which will be presently described.

Brackets 25 and 26 are bolted upon or otherwise fastened to the frame 5 and on the opposing faces of these brackets 25 and 26 are brazed or otherwise mounted cup-shaped members 27 and 28 respectively. A cushion or facing of rubber as 29 is preferably provided within each of these cup-shaped members to eliminate noise which might otherwise be produced by the impact of the corresponding discs or plates 19 and 20 with the members. These rubber cushions may be vulcanized or otherwise suitably fastened to their respective members. The members 27 and 28 serve to position the rubber block 5 and each of said members is provided with a central orifice as 30 of sufficient size to permit the nuts 23 and 24 and their corresponding lock nuts to pass freely therethrough.

The inner end of the lever 7 in the present embodiment is pivotally connected to the axle 6 by means of a U-bolt 31 having its opposite extremities 32 extending through the lever and attached thereto by means of nuts 33. This lever is channel-shaped and gradually tapering but any other suitable construction might be substituted therefor.

The weight of the vehicle body and load is supported by the suspension levers as 7 and thus at all times the rubber blocks are maintained under partial compression in the same manner as leaf springs. The shock produced by an obstruction causes a further compression in the same direction, whereas the tendency to rebound releases the compression in this direction and tends to cause a compression in the opposite direction.

The normal position of the suspension unit is indicated in solid lines in Fig. 1 of the drawing. When the wheel 34 passes over an obstruction the axle 6 is caused to move upwardly in an arcuate path with the axis of the shaft 8 as a center, carrying with it the lever 7 to some such position as is indicated in dot and dash in this figure. The swinging movement of the lever 7 causes the upright arm or post 13 to swing also about the axis of the shaft 8 in a clockwise direction, as viewed in Fig. 1, drawing the bolt 17 to the right. This movement of the bolt 17 causes the plate 20 to be drawn by the nut 24 in the same direction and to further compress the rubber block 18 against the cup-shaped member 27. The position of the parts in Fig. 2 corresponds approximately to the dot and dash position of the axle and lever in Fig. 1.

The rebound action following the impact tends to cause the lever 7 to swing slightly below its normal position. This produces a movement of the bolt 17 to the left of such position, causing the nut 23 on the bolt 17 to come into contact with the plate 19 and to force the block 18 of rubber against the cup-shaped member 28, compressing this block. It will thus be evident that the tendency of the lever 7 to swing either above or below its normal position is resisted by the rubber block.

It will be evident from the foregoing description that the blocks of rubber yieldingly support the load of the vehicle at all times and resist the bound of the axle under shock and the accompanying tendency of the vehicle body to rebound thereafter. Thus this rubber performs the function of the usual leaf spring support and in addition thereto absorbs the rebound which has heretofore been performed only by the various forms of snubbers or shock absorbers provided for this purpose. The release of the compression of the blocks does not produce the period of vibration or oscillation common to all steel springs. This is largely due to the self damping effect of the rubber produced by the high internal friction characteristic of this material.

The size of the rubber blocks depends upon the weight and capacity of the body. Any suitable shape may be used. The rubber should be compounded to provide the necessary elasticity and internal friction. Such a block will practically eliminate the so-called "tramping" of the front axle and very materially improve the steering action of the vehicle.

The form of suspension constituting the present invention is noiseless in action and provides greater safety than the usual spring support. The elimination of vibration very materially reduces the cost of maintenance of the vehicle and increases the life thereof.

The form and arrangement of the various mechanical suspension elements coacting with the rubber blocks may be very materially changed without departing from the spirit of the invention and it should be distinctly understood that the embodiment shown and described is merely for the purpose of illustration.

Having thus described my invention, what I claim and desire to protect by Letters Patent is:

1. A vehicle suspension unit comprising a substantially rigid lever, a block of rubber having an orifice therethrough, means for supporting said block, a bolt connected to said lever and extending therefrom through said block in said orifice, and nuts threaded on said bolt on opposite sides of said block causing said block to be compressed when said bolt is moved longitudinally of said orifice in either direction beyond the normal position by movement of said lever.

2. A vehicle suspension unit comprising a substantially rigid lever, a block of rubber having an orifice therethrough, means for supporting said block, a bolt pivotally connected at one end to said lever and projecting through said block in said orifice, and adjustable nuts on said bolt on opposite sides of said block of greater cross-sectional area than said orifice, causing said block to be compressed when said bolt is moved longitudinally of said orifice in either direction beyond the normal position by movement of said lever.

3. A vehicle suspension unit comprising a substantially rigid lever, a block of rubber having an orifice therethrough, means for supporting said block, orificed plates on opposite ends of said block, a bolt pivotally connected at one end to said lever and projecting through the orifices in said block and said plates, and adjustable nuts on said bolt outside of said plates of greater cross sectional area than the orifices therein, causing said block to be compressed by said plates when said bolt is moved longitudinally in either direction beyond the normal position by the movement of said lever.

4. A vehicle suspension unit comprising a substantially rigid lever, oppositely disposed brackets, cup shaped members mounted on the opposing faces of said brackets, a block of rubber supported by said cup shaped members and having an orifice passing therethrough, a bolt pivotally connected at one end to said lever and projecting through said block and said cup shaped members, and nuts threaded on said bolt on opposite sides of said block causing said block to be compressed against one of said cup shaped members when said bolt is moved longitudinally in either direction beyond the normal position by the movement of said lever.

5. In a vehicle suspension unit, a rubber block provided with an orifice therethrough, means including oppositely disposed cup shaped members for supporting said block, a bolt extending through said orifice and free to move therein, and nuts on said bolt on opposite sides of said block, said nuts coacting with the corresponding faces of the block to cause said block to be compressed when said bolt is moved longitudinally in said block in either direction beyond the normal position.

6. In a vehicle suspension unit, opposing cup shaped members having flaring walls, a rubber block interposed between said members and having an orifice therethrough extending between the faces opposing said members, a bolt extending through said orifice, and nuts on said bolts on opposite sides of said block, the nut on one side of said block acting to compress said block into said member on the opposite side thereof as said bolt is drawn toward this member, and the nut on the opposite side of the block acting to compress the block into the other member when said bolt is drawn in the opposite direction.

Signed at New York, county of New York, State of New York, this 10th day of March, 1926.

HENRY G. McCOMB.